UNITED STATES PATENT OFFICE.

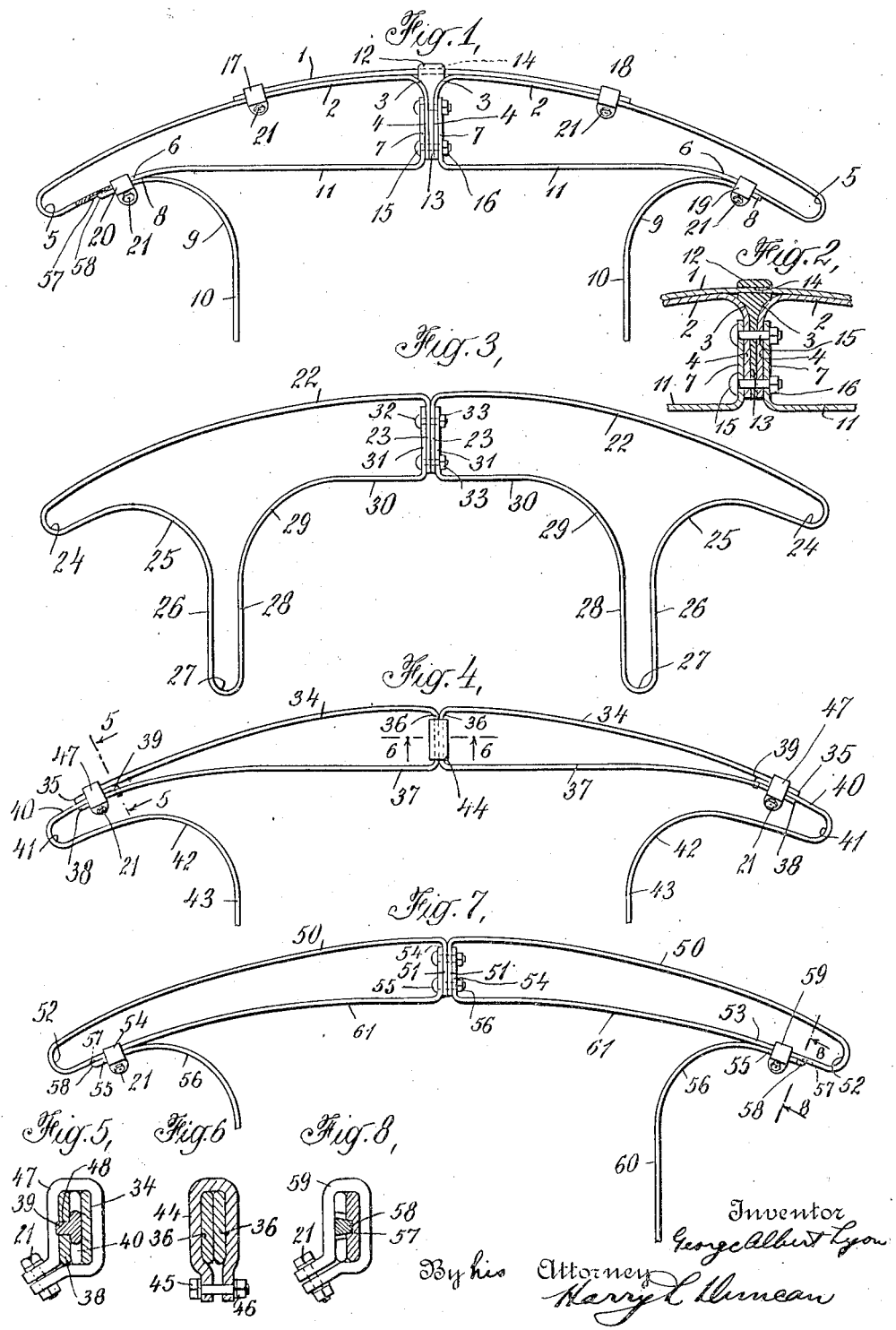

GEORGE ALBERT LYON, OF PHILADELPHIA, PENNSYLVANIA.

STIFFENED-FRONT AUTOMOBILE-BUFFER.

1,357,506.   Specification of Letters Patent.   Patented Nov. 2, 1920.

Application filed January 22, 1920. Serial No. 353,213.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Stiffened-Front Automobile-Buffers, of which the following is a specification, taken in connection with the accompanying drawing.

This invention relates especially to stiffened front automobile buffers in which the buffer front which may be formed of or comprise resilient strip such as tempered spring steel may be formed of detachably connected front elements of generally similar shape and having coöperating stiffened junction portions which connect the elements together and simultaneously support the front and back portions of these elements so as to form a stiffened or trussed construction having desirable rigidity and strength. This arrangement also makes each of the front elements of considerably less length which is highly desirable from the commercial standpoint, since it facilitates shipping and storage of the buffers in disassembled condition. The junction portions may comprise overlapping ends of the resilient strip forming each of the front elements which adds to the stiffness and strength of the junction portions which may be detachably clamped or bolted together and the buffer front may be further strengthened by having additional reinforcing strips connected to either the front or back faces of the compound buffer front which may have attaching members of any suitable construction adjustably or otherwise connected thereto so as to support the buffer from an automobile or other vehicle.

In the accompanying drawing showing in a somewhat diagrammatic way illustrative embodiments of this invention, Figure 1 is a plan view showing one form of buffer.

Fig. 2 is an enlarged sectional view showing the coöperating junction portions of the front elements.

Figs. 3 and 4 are plan views showing other illustrative buffers.

Fig. 5 is an enlarged transverse section taken substantially along the line 5—5 of Fig. 4.

Fig. 6 is an enlarged transverse section through the junction clip taken substantially along the line 6—6 of Fig. 4.

Fig. 7 is a plan view showing still another arrangement; and

Fig. 8 is an enlarged transverse section taken substantially along the line 8—8 of Fig. 7.

The compound buffer front may be composed of two coöperating front elements formed of or comprising resilient strip such as spring steel strip a quarter of an inch or so thick and two inches wide more or less, the width of the strip being preferably arranged substantially vertically to give increased vertical stiffness under running conditions of the vehicle. The front elements may, if desired, comprise end loops 5 and the front or impact receiving portions 2 of each element may advantageously be forwardly arched in some cases, as indicated, and formed with the backwardly bent portions 3 communicating with the junction portions 4. The other end of the front element strip may be formed with a rear portion 11 of substantially straight contour, if desired, merging into the junction portion 7 inside or preferably outside of the coöperating junction portion 3. The coöperating junction portions may be clamped or bolted together in any suitable way as by the connecting bolts 15 and nuts 16 passing therethrough to securely connect the front elements and it is sometimes desirable to interpose between the junction portions a stiffening element of shaped metal such as 13 which may be formed so as to coöperate with the curved portions 3 of the front elements and have on one or both ends a projecting slotted retainer, such as 12, having a transverse slot 14 through which the one or more reinforcing strips 1 may be slipped to be securely retained at this central part of the buffer. The ends of these reinforcing strips may be clamped or secured to the coöperating parts of the front elements in any suitable way as by the clamping devices 17 tightened upon these parts as by the bolts 21 and of course such reinforcing strips contribute to keep the buffer front elements in vertical alinement and resist undesirable vertical yielding under running conditions of the vehicle.

The front elements may have detachably or otherwise connected thereto suitable attaching members, such as 10, which may be curved as at 9 and be formed with connector portions 8 of such shape as to properly coöperate with the connector portions 6 on the front elements to which they may be adjustably clamped or connected by any suitable form of clamping devices 20 having tightening bolts or nuts 21. In some cases it is desirable to form these coöperating connector portions of the attaching members with coöperating alining projections, such, for instance, as the projecting tip 58, which may be formed on the end of the attaching member and engage a slot or recess 57 in the coöperating connector portion or strip so as to substantially maintain the vertical alinement of the parts at this point while they are also held against undesirable movement where the inclosing clamping device 20 holds them together. Of course for shipping purposes the buffer elements may be taken apart and closely packed, the front reinforcing strip 1 being preferably of such length and contour as to fit closely around the front strip of either of the front elements which may be superimposed, while the attaching members may be arranged in connection with these front elements to form a desirable and compact package while at the same time the buffer may be readily and quickly assembled and attached to an automobile or other vehicle without any special or technical knowledge or ability beyond that possessed by the ordinary garage man or car owner.

Fig. 3 shows another arrangement in which the front elements may be formed with integral attaching members which may comprise the attacher loops 27 and the substantially parallel attaching portions 26, 28, if desired. The spring strip forming the inner attaching portion 28 may preferably have slots or holes for hook bolts or other attaching devices and may be curved inward as at 29 so as to form the substantially straight portion 30 on which the bent up junction portion 31 may be arranged. The front or impact receiving portion 22 of this spring strip may have a coöperating junction portion 23 formed thereon and these overlapping or coöperating junction portions may be bolted together and to the coöperating junction portions of the other front element as by the bolts 32 and nuts 33 passing through holes or apertures formed in these strip ends. Each element may also, if desired, comprise an end loop 24 and curved yielding portion 25 connecting the end loop to the attacher loop 27 to give increased resilience and cushioning action under collision conditions.

Fig. 4 shows another arrangement of detachably connected front elements in which the spring steel or other strip 34 forming the impact receiving portion of the buffer front may have the end 35 substantially in line with the other end 38 of this strip so as to be connected to an attaching or other member of the buffer while the rear portion 37 of this front element may have a bent up junction portion 36 adapted to be clamped or bolted to the coöperating junction portion of the other front element so as to form a stiffened trussed buffer front having somewhat increased stiffness. For clamping these junction portions together a special junction clip 44 may be used of such construction as is indicated somewhat diagrammatically in Fig. 6, this sheet metal clip being bent around the coöperating junction portions or strips 36 while its depending ends may be forced together or tightened as by bolts 45 and nuts 46. If desired the coöperating or overlapping ends of each of these front elements may be clamped or connected to a loop end attaching member having a connector portion 40 adapted to overlap or be arranged between the coöperating connector portions of the front element and be securely held in position with relation thereto as by one or more clamping devices 47 inclosing these parts of the buffer. Also as shown more in detail in Fig. 5 this connector portion 40 may have an alining tip or projection 39 passing through a slot 48 in one of the coöperating connector portions or strips so as to secure increased vertical alinement at this point and assist the alining action of the clamping device 47 in this connection. This attaching member may as indicated have the looper portion 41 which may form the looped end of the buffer and may have a curved yielding portion 42 to give increased resilience to the buffer, while the attaching member 43 projecting toward the automobile frame member or other part of the vehicle may have the desired length and construction to be clamped or bolted to the vehicle member as by hook bolts or other clamping devices of any suitable character.

As shown in Fig. 7 two coöperating front elements of such resilient strip may, if desired, have a more or less uniformly arched or forwardly curved impact receiving portion 50 terminating at the upper ends in end loops 52 while the strips 61 forming the inner portions of these front elements may be curved in a generally similar way so that the elements have a pleasing outline and are somewhat wider adjacent the central or junction portions of the elements. These junction portions may comprise overlapping bent ends 51, 54 which of course greatly stiffen these coöperating junction portions and when clamped together as by the bolts 55, 56, a substantially rigid trussed connection is formed in this way which gives desirable action under collision conditions. The attaching member 60 of resilient strip or other construction may have outwardly curved yielding portions 56 and connector portions 55 curved so as to coöperate with the adjacent connector portions of the front elements to which they may be secured or clamped as by any suitable form of clamping devices 54 which may be tightened on the strips by nuts or bolts such as 21. Also, if desired, alining tips or projections such as 58 may be arranged on these connector portions, as shown in Fig. 8, so as to engage slots or preferably alining grooves 57 in the coöperating strip to promote the alinement of these parts and minimize undesirable looseness under running conditions of the vehicle.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The resilient automobile buffer comprising two substantially similar spring strip front elements having end loop portions and front and rear portions gradually separating toward the buffer center and connected by bent overlapping junction portions adjacent the central part of the buffer, a front slotted stiffening element interposed between said junction portions and connecting bolts detachably connecting together said junction portions and retainer, strip reinforcing means passing through said front retainer and clamped adjacent its ends to the coöperating impact receiving portions of the front elements to reinforce and stiffen the same, spring strip attaching members and clamping devices to adjustably connect said attaching members to said front elements.

2. The resilient automobile buffer comprising two substantially similar spring strip front elements having end loop portions and front and rear portions connected by bent overlapping junction portions adjacent the central part of the buffer, a front slotted stiffening element interposed between said junction portions and connecting bolts detachably connecting together said junction portions and retainer, strip reinforcing means passing through said front retainer and clamped adjacent its ends to the coöperating impact receiving portions of the front elements to reinforce and stiffen the same, attaching members and devices to connect said attaching members to said front elements.

3. The resilient automobile buffer comprising two spring strip front elements having end loop portions and front and rear portions connected by bent overlapping junction portions adjacent the central part of the buffer, and connecting bolts detachably connecting together said junction portions, strip reinforcing means clamped adjacent its ends to the coöperating impact receiving portions of the front elements to reinforce and stiffen the same, attaching members and devices to connect said attaching members to said front elements.

4. The automobile buffer comprising substantially similar resilient strip front elements having end loop portions and separated front and rear central portions connected by integral bent overlapping junction portions adjacent the central part of the buffer, connecting bolts securing together said junction portions, strip reinforcing means clamped adjacent its ends to the coöperating impact receiving portions of the front elements to reinforce and stiffen the same and spring strip attaching members coöperating with the outer ends of said front elements and adapted to connect said front elements to the automobile.

5. The automobile buffer comprising resilient strip front elements having end loop portions and separated front and rear central portions connected by integral bent overlapping junction portions adjacent the central part of the buffer, connecting devices securing together said junction portions and spring strip attaching members coöperating with the outer ends of said front elements and adapted to connect said front elements to the automobile.

6. The automobile buffer comprising resilient strip front elements having end portions and separated front and rear central portions connected by bent overlapping junction portions adjacent the central part of the buffer, connecting devices securing together said junction portions and attaching member coöperating with the outer ends of said front elements and adapted to connect said front elements to the automobile.

7. The buffer front comprising two substantially similar resilient strip front elements having end loop portions and separated front and rear central portions connected by bent overlapping junction portions extending transversely of the buffer front adjacent the central part thereof, and connecting bolts detachably securing together said junction portions, and strip reinforcing means clamped adjacent its ends to the coöperating impact receiving portions of the front elements to reinforce and stiffen the same.

8. The buffer front comprising resilient strip front elements having end loop portions and separated front and rear central portions connected by bent overlapping junction portions extending transversely of the buffer front, adjacent the central part thereof and connecting bolts detachably securing together said junction portions.

9. The buffer front comprising resilient strip front elements having end portions and separated front and rear central portions connected by bent overlapping junction portions extending transversely of the buffer front and connecting devices detachably securing together said junction portions.

10. The automobile buffer front comprising two substantially similar spring strip closed outline front elements having end loop portions and separated front and rear central portions connected by bent overlapping junction portions, a front slotted stiffening element interposed between said junction portions and connecting devices detachably securing together said junction portions and strip reinforcing means passing through said front retainer to reinforce the coöperating impact receiving portions of the front elements.

11. The automobile buffer front comprising two substantially similar spring strip closed outline front elements having end loop portions and separated front and rear central portions connected by bent overlapping junction portions and connecting devices detachably securing together said junction portions.

12. The automobile buffer front comprising spring strip closed outline front elements having end portions and separated front and rear central portions connected by bent overlapping junction portions and connecting devices detachably securing together said junction portions.

GEORGE ALBERT LYON.